United States Patent
Bordawekar et al.

(10) Patent No.: US 11,194,778 B2
(45) Date of Patent: Dec. 7, 2021

(54) METHOD AND SYSTEM FOR HYBRID SORT AND HASH-BASED QUERY EXECUTION

(71) Applicant: International Business Machines Corporation, Armonk, NY (US)

(72) Inventors: Rajesh Ramkrishna Bordawekar, Yorktown Heights, NY (US); Vincent Kulandaisamy, Portland, OR (US); Oded Shmueli, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 461 days.

(21) Appl. No.: 14/974,227

(22) Filed: Dec. 18, 2015

(65) Prior Publication Data
US 2017/0177573 A1  Jun. 22, 2017

(51) Int. Cl.
*G06F 16/22* (2019.01)
*G06F 16/2455* (2019.01)

(52) U.S. Cl.
CPC ...... *G06F 16/2255* (2019.01); *G06F 16/2455* (2019.01); *G06F 16/24556* (2019.01)

(58) Field of Classification Search
None
See application file for complete search history.

(56) References Cited

U.S. PATENT DOCUMENTS

| | | | |
|---|---|---|---|
| 5,761,652 A * | 6/1998 | Wu | G06F 16/2264 |
| 5,854,938 A * | 12/1998 | Ogi | G06F 7/24 712/30 |
| 6,334,125 B1 | 12/2001 | Johnson et al. | |
| 6,567,802 B1 * | 5/2003 | Popa | G06F 17/30463 |
| 9,917,727 B2 * | 3/2018 | Hong | H04L 41/0806 |
| 2006/0085592 A1 * | 4/2006 | Ganguly | G06F 16/2456 711/114 |
| 2006/0149744 A1 * | 7/2006 | Das | H04L 67/2819 |
| 2006/0288030 A1 * | 12/2006 | Lawrence | G06F 16/2456 |
| 2007/0005556 A1 * | 1/2007 | Ganti | G06F 17/30575 |
| 2007/0234005 A1 * | 10/2007 | Erlingsson | G06F 17/30949 711/216 |
| 2008/0229056 A1 * | 9/2008 | Agarwal | G06F 17/30949 711/216 |
| 2009/0006346 A1 * | 1/2009 | C N | G06F 16/24542 |
| 2009/0006399 A1 * | 1/2009 | Raman | G06F 16/2456 |
| 2011/0249676 A1 | 10/2011 | Singh et al. | |
| 2012/0130940 A1 * | 5/2012 | Gattani | G06F 17/30592 707/600 |
| 2013/0311492 A1 * | 11/2013 | Calvignac | G06F 17/30949 707/756 |
| 2013/0332434 A1 * | 12/2013 | Sompolski | G06F 17/30466 707/701 |

(Continued)

*Primary Examiner* — Christopher J Raab
(74) *Attorney, Agent, or Firm* — Peter Edwards, Esq.; McGinn I.P. Law Group, PLLC.

(57) ABSTRACT

A database system, computer program product, and a method for evaluating aggregates in database systems includes hashing of aggregation keys on a per bucket basis, and depending on a number of hashed tuples per bucket, sorting said tuples. Additionally, depending on the number of hashed tuples per bucket, the bucket is kept without change. Moreover, depending on the number of hashed tuples per bucket, maintaining a secondary hash table for a particular bucket, map tuples to it, aggregate as you map.

20 Claims, 9 Drawing Sheets

(56) References Cited

U.S. PATENT DOCUMENTS

| | | | |
|---|---|---|---|
| 2015/0039614 A1* | 2/2015 | Daly | G16B 50/30 |
| | | | 707/737 |
| 2015/0081602 A1 | 3/2015 | Talley et al. | |
| 2015/0154256 A1* | 6/2015 | McKenna | G06F 16/24542 |
| | | | 707/718 |
| 2015/0294065 A1* | 10/2015 | Gautier | G16B 30/00 |
| | | | 702/19 |
| 2016/0055220 A1* | 2/2016 | Joshi | G06F 16/248 |
| | | | 707/722 |

* cited by examiner

METHOD AND SYSTEM FOR HYBRID SORT AND HASH-BASED QUERY EXECUTION

BACKGROUND OF THE INVENTION

Field of the Invention

The disclosed invention relates generally to a method and system for sorting and query execution, and more particularly, but not by way of limitation, relating to a system, apparatus and method for a hybrid sort and hash-based query execution.

Description of the Related Art

Recently, there has been a massive increase in information disseminated to users, such as social network sites, blogging sites, mobile devices, streaming media, etc. There is a value in accessing and organizing such a large amount of data from such different types of sources. Analyzing information from such large amount of data that are available and change quickly can be overwhelming.

Therefore, in order to process large volumes of data that also may change rapidly while having a limited amount of computing memory has been a difficult task. In order to deal with such large amount of information, certain techniques of grouping the information have been used.

Traditionally, sort or hash based algorithms have been used to implement group-by operations (e.g., group all items with a particular key). Both hash and sort based approaches have their pros and cons. For example, hash-based approaches are very effective for scenarios where the number of groups is small. When the number of groups increases, hashing becomes very costly. For cases with a large number of groups, sort based grouping becomes more effective.

Therefore, there is also a need for efficiently and flexibly implementing grouping operations, in particular, those that result in a very large number of groups.

SUMMARY OF INVENTION

In view of the foregoing and other problems, disadvantages, and drawbacks of the aforementioned background art, an exemplary aspect of the disclosed invention provides a system, apparatus, and method of providing hybrid sort and hash-based query execution.

One example aspect of the disclosed invention provides a method for evaluating aggregates in database systems including hashing of aggregation keys on a per bucket basis, and depending on a number of hashed tuples per bucket, sorting said tuples.

Further, depending on the number of hashed tuples per bucket, the method keeps a bucket without change. Additionally, depending on the number of hashed tuples per bucket, the method can maintain a secondary hash table for a particular bucket, mapping tuples to the secondary hash table, and aggregating during mapping of the tuples to the secondary hash table.

The hashing of the aggregation keys on a per bucket basis further includes performing the aggregation of the keys as tuples are mapped by hashing on a per bucket basis in a hash table. The aggregation is preformed during the hashing.

In real-time there is a switching among a plurality of modes depending on the number of hashed tuples per bucket, wherein the plurality of modes includes a list mode, a no change mode, and secondary hashing mode, wherein the list mode includes maintaining a list including mapped tuples to a particular bucket, and sorting a final list to evaluate aggregates, wherein the no change mode includes no change to the particular bucket, and wherein the second hashing mode includes maintaining a secondary hash table for the particular bucket, mapping tuples to the secondary hash table, and aggregate as the secondary hash table is mapped.

Another aspect of the disclosed invention includes a database system including a memory, a processor coupled to the memory, the processor configured to perform a method including hashing of aggregation keys on a per bucket basis, and depending on a number of hashed tuples per bucket, sorting said tuples. The database system can be implemented in cloud computing.

Yet another aspect of the disclosed invention includes a computer program product including a computer readable storage medium having program instructions embodied therewith, the program instructions readable and executable by a computer to cause the computer to perform a method, including a memory, a processor coupled to the memory, the processor configured to perform the method includes hashing of aggregation keys on a per bucket basis, and depending on a number of hashed tuples per bucket, sorting said tuples.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

DETAILED DESCRIPTION OF A PREFERRED EMBODIMENTS

Figure 1:
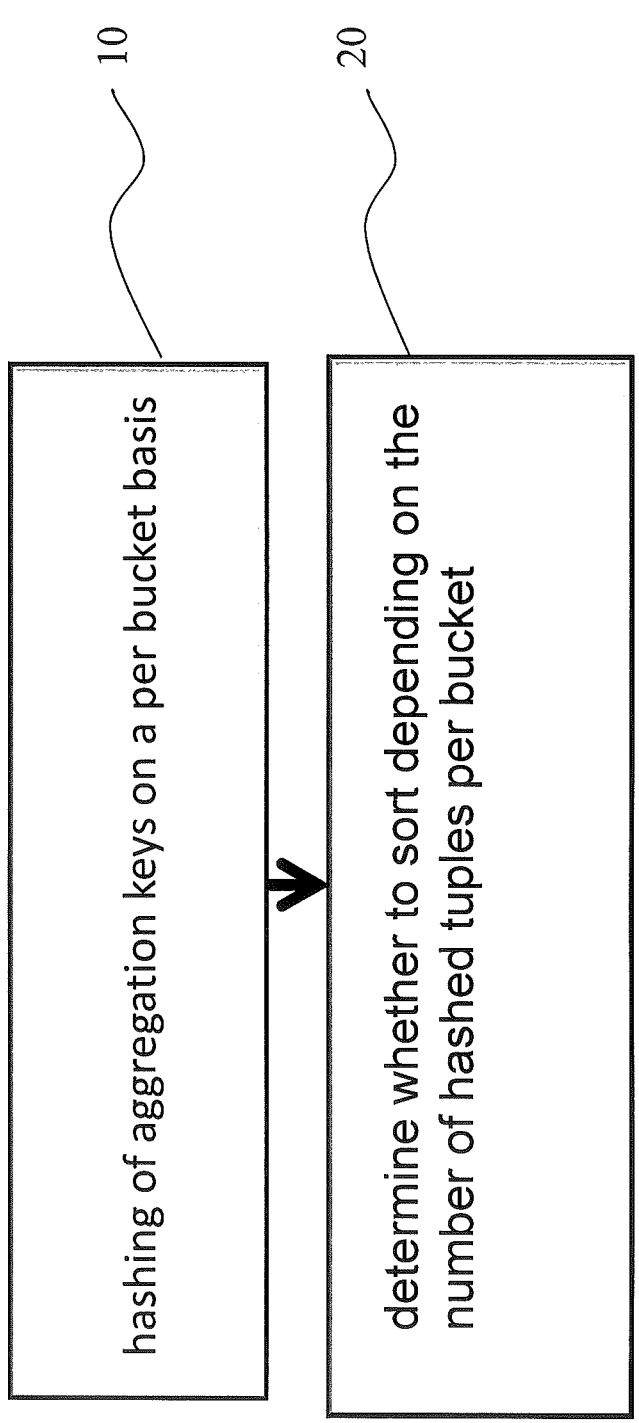
FIG. 1 illustrates a flow-chart for the hybrid sort and hash-based query execution in an example embodiment.

The invention will now be described with reference to the drawing figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

The disclosed invention addresses the problem of efficiently implementing grouping operations, in particular, those that result in a very large number of groups. Traditionally, sort or hash based algorithms have been used to implement group-by operations (e.g., group all items with a particular key). Both hash and sort based approaches have their pros and cons. For example, hash-based approaches are very effective for scenarios where the number of groups is small.

When the number of groups increases, hashing becomes costly. For cases with a large number of groups, sort based grouping becomes more effective.

There are techniques that include maintaining statistics and a cost model. One can decide on an evaluation sequence based on examining a limited portion of the execution space. However, currently, there are no real-time adaptivity. Moreover, cost models are not always accurate. For expressions, current optimizers cannot predict cardinality of resulting relations.

Aggregates are an important component of database technology. However, obtaining aggregates can be very costly. The disclosed method is expected to result in improved aggregation performance, especially for skewed data.

Traditional approaches use one of the hash- or sort-based grouping approaches. This leads to additional complexity in query planning and code generation, as different logic needs to applied when the number of groups becomes larger. This results in different code generation paths for different scenarios, that further adds to the complexity.

Referring to FIG. 1, in an example embodiment for evaluating aggregates in a database system, first there is a hashing of aggregation keys on a per bucket basis (step 10). Then, there is a determination made as to whether sorting of the tuples is performed depending on the number of hashed tuples per bucket (step 20).

Figure 2:
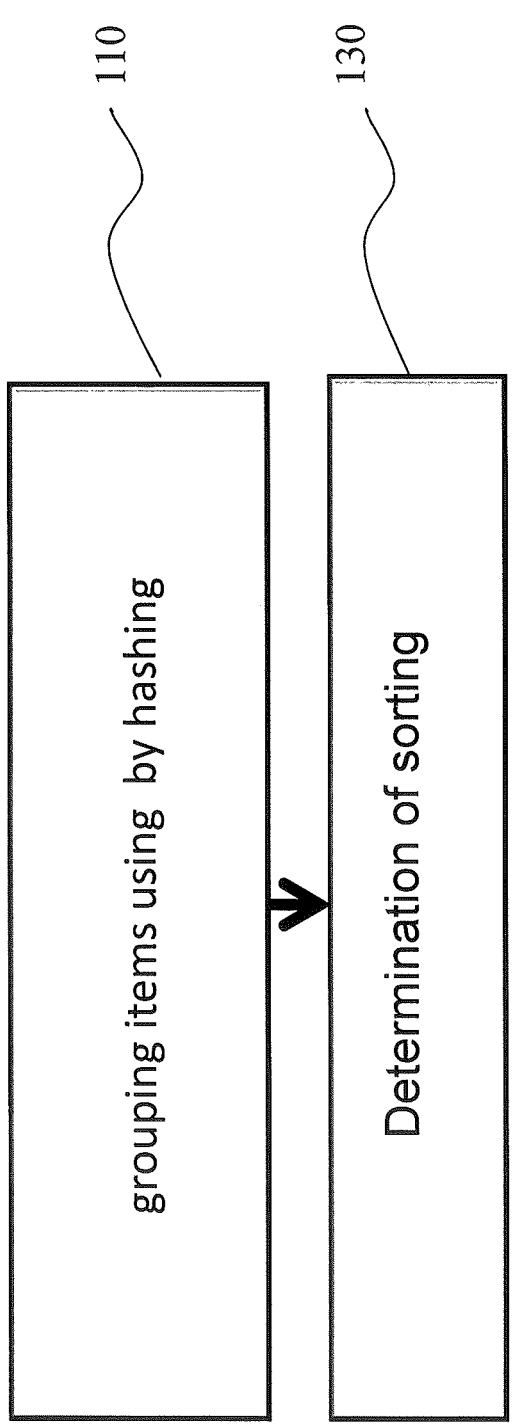
FIG. 2 illustrates further detail of the hybrid sort and hash-based query execution in an example embodiment.

Referring to FIG. 2, an example embodiment use a hybrid hash-and-sort based approach is further detailed. The approach first groups the items using the traditional hashing techniques (step 110). However, it is preferred that the step of hashing is performed first. Each hash table entry corresponds to a key range, and points to a list of all items whose keys lie that range. Based on the query, the items in the list can be sorted (step 130). This approach makes the best use of both approaches, and requires only one code generation path as hash-based grouping is always used at the higher level.

Therefore, generally, the disclosed technique includes a method for evaluating aggregates in database systems including, hashing of the aggregation keys on a per bucket basis, and depending on the number of hashed tuples per bucket, sort said tuples.

An aggregate function can be a function where the values are grouped together as input on certain criteria to form a single value of more significant meaning or measurement such as a set, a bag or a list. Aggregates or aggregation functions are, for example, maximum (i.e., max( )), minimum (i.e., min( )), summation (i.e., sum( )), average (e.g., arithmetic mean, etc.), count (i.e., count( )), etc.

In relational optimizers a choice is made at compile time as to whether to use aggregate via hashing, or to use aggregate via sorting. However, the disclosed technique mixes both methods and delaying decisions to execution time. This then provides better overall system aggregation performance.

One of the features of the present discloser is making hashing the first step (e.g., step 10 in FIG. 1 or 110 in FIG. 2). Another feature is deciding on a per bucket basis how the bucket's data should be processed as also seen in step 10 or step 110. Yet, another feature is performing aggregations during hashing as seen in steps 110 in FIG. 2 and step 10 in FIG. 1. Yet, another feature is switching in real time between a list (of items or of pages) mode or provide a secondary hashing mode as seen in the following FIG. 3.

Figure 3:
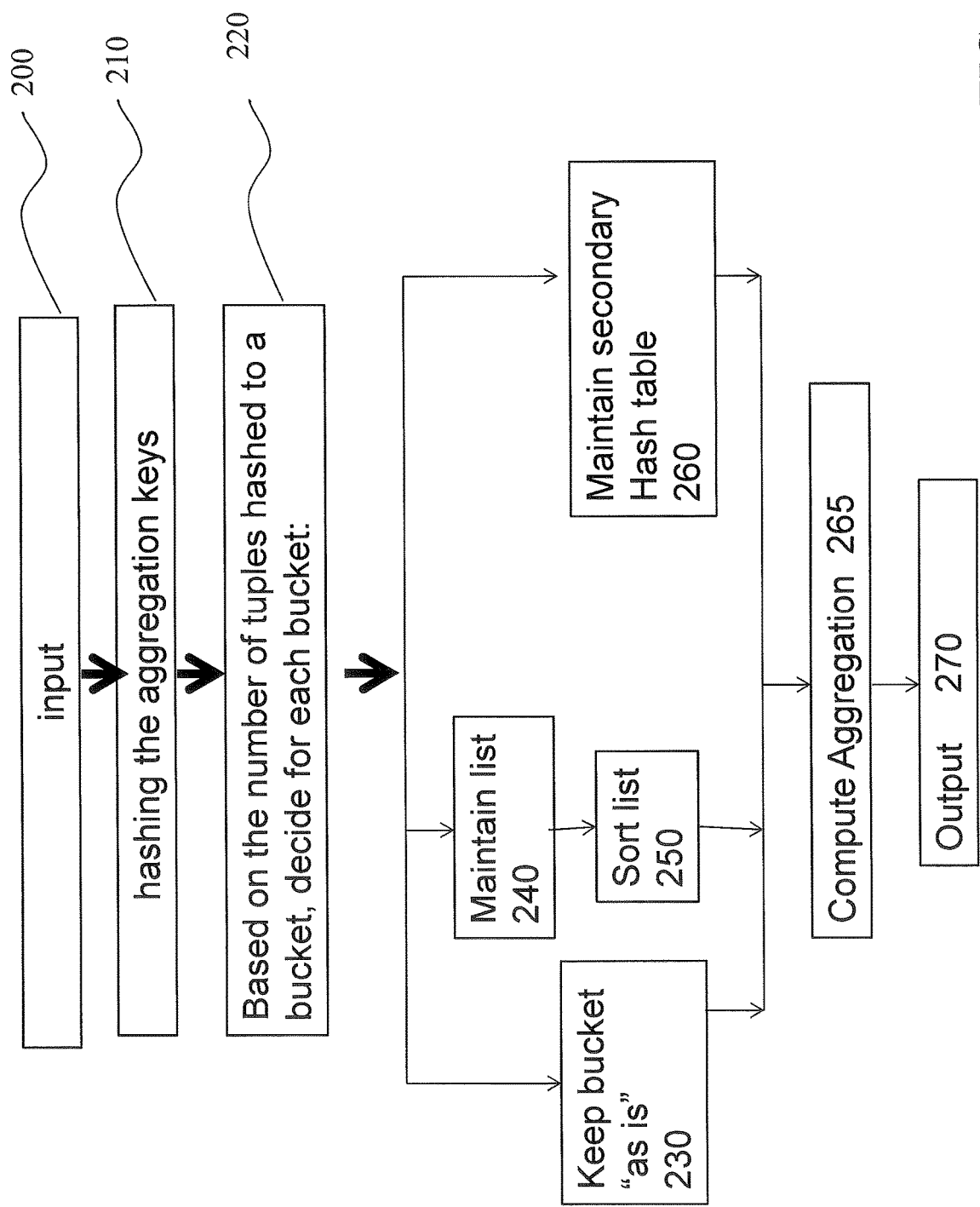
FIG. 3 illustrates a further detail for the hybrid sort and hash-based query execution in an example embodiment.

Another feature is that one can avoid sorting if number of distinct keys is at most k (say k=10), by doing aggregation "in place" via scanning lists as seen in FIG. 3.

Therefore, referring to FIG. 3, there is disclosed a further detail of method for evaluating aggregates in database systems shown in FIGS. 1 and 2. The method includes first hashing the aggregation keys and performing aggregation as tuples are mapped by hashing on a per bucket basis (step 210) from the input data received (step 200).

Based on the number of tuples hashed to a bucket, decide for each bucket:

(a) whether to keep the bucket as is (step 230);

(b) whether to maintain a list (of items or pages) containing mapped tuples to this bucket (step 240), then sort final list to evaluate aggregates (step 250); and (c) additionally, it can be selected to maintain a (secondary) hash table for this bucket, map tuples to it, aggregate as you map (step 260).

Then, after the determination in the steps 230, 250, or 260, the aggregation is computed in step 265.

Finally an output (step 270) is made from the aggregation in step 265.

With each bucket the system keeps a count of up to k (e.g., k is an integer equal to 10) distinct keys. If the number of keys does not exceed k then no there is no reason to sort, then it is decided to simply do aggregate in place by scanning "list" (step 230). However, if the count exceeds k distinct keys, then it is determined to sort the final list to evaluate aggregates (step 250). Therefore, sorting can be decided when the distinct keys exceed k and the many tuples are mapped to the bucket. Therefore, when the count exceeds k distinct key, it is decided to maintain a list (of items or pages) containing mapped tuples to this bucket (step 240), then sort final list to evaluate aggregates (step 250).

In the case of maintaining a secondary has table (step 260), it is when there a plurality of duplicate tuples in the list or pages that can be efficiently aggregated using secondary hash table rather than maintaining list of items or pages.

When number of tuples mapped to a given bucket reaches a threshold, the system estimates the number of distincts in the list of items or pages on demand. This determines how many distinct tuples are mapped to this hash bucket. If the ratio of number distinct is low with regard to the number of tuples mapped to a hash bucket then it is efficient to aggregate them using the hash table.

In addition to efficient aggregation, this step of maintaining a secondary hash table significantly reduces the memory requirement when there are a large number of duplicate tuples added to list of items or pages. This can happen due to collision on the grouping/aggregation key.

Therefore, as mentioned previously, another feature is switching in real time between a list (of items or of pages) mode (steps 240-250) or provide a secondary hashing mode as seen in step 260.

Yet, another feature is that one can avoid sorting if number of distinct keys is at most k (say k=10), by doing aggregation "in place" via scanning lists as seen in step 230.

Figure 4:
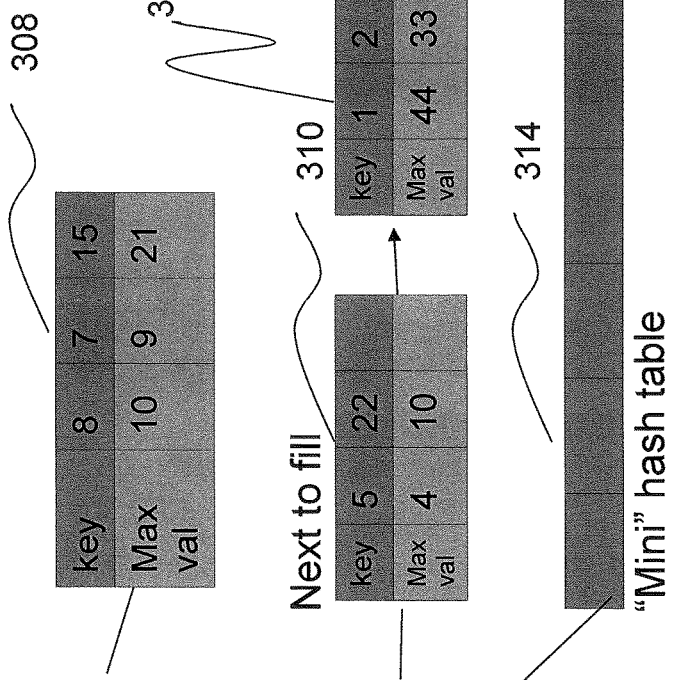
FIG. 4 illustrates the architecture of an example embodiment.

Referring, to FIG. 4 the architecture of an example embodiment is illustrated. A set of selections are made 302 for the product number (Product_Num) and maximum number of orders (Max(order)). Additionally, there is selection made of FROM (selected as Orders), WHERE (selected as Department='Toy'), and GROUP BY (selected as grouping by product number). This data is inputted for hashing.

Then the product number of 15, 7, 8 is hashed as seen in 304 to the bucket in the hash table 300. The key and maximum values are provided in 308 for the bucket with 8, 7, 15 as the key and maximum values as 10, 8, 21.

The product number (5, 2, 1) in reference 306 is hashed to the hash table 300. The next to fill the bucket includes the keys 5, 22 and maximum values 4 and 10, respectively. Then as seen in entry 312, the key is 1, 2, 5 and the maximum values are 44, 33, 11, respectively.

Additionally, a miniature or secondary hash table can be maintained 314 depending on the hashed truples per bucket.

With each bucket the system can keep a count of up to k (say 10) distinct keys. If the number of keys does not exceed k then there is no reason to sort, and then the database system can simply do aggregate in place by scanning "list" as discussed above. However, if the number of keys exceeds k, then a case for sorting is made. Moreover, the many tuples are mapped to the bucket. The decision on whether to sort or not is dynamically determined in real-time.

Therefore, FIG. 4 shows an example of hashing aggregation keys on a per bucket basis. Moreover, depending on the number of hashed tuples per bucket in the hash table 300, a determination of whether to sort or not is made.

Concerning the secondary hash table or mini hash table 314, Product_Num 55 can be mapped to the same bucket 5, 2, 1 and 22 (shown in reference 306). There could be millions of tuples with Product_Num 55 added to the list of items and pages to this bucket. Then, the system will convert that list or pages into secondary hash table 314.

Therefore, the method and system above provides for a dynamic and adaptive aggregation using the disclosed hybrid hash and sort based approaches shown above.

Exemplary Hardware and Cloud Implementation

Figure 5:
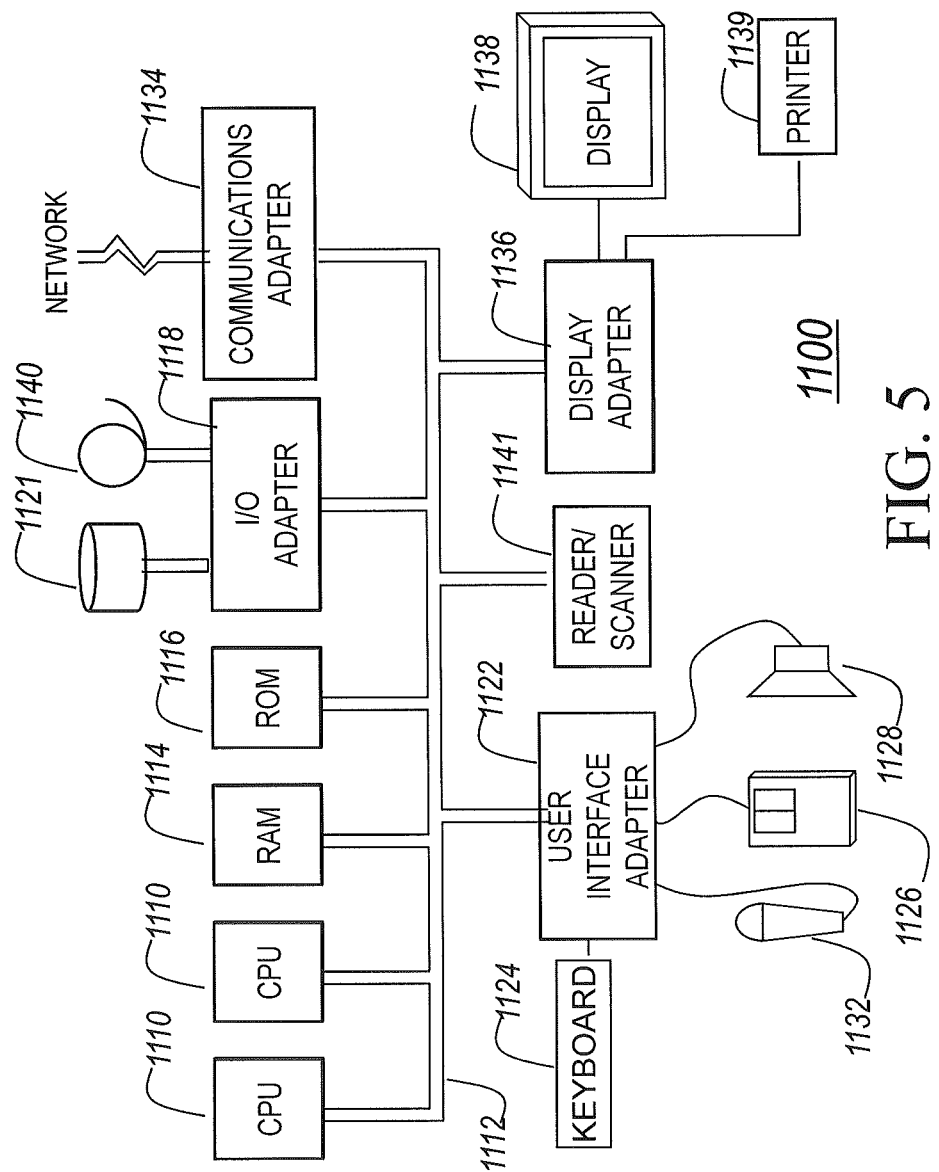
FIG. 5 illustrates an exemplary hardware/information handling system for incorporating the exemplary embodiment of the invention therein.

FIG. 5 illustrates another hardware configuration of an information handling/computer system 1100 in accordance with the disclosed invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Figure 6:
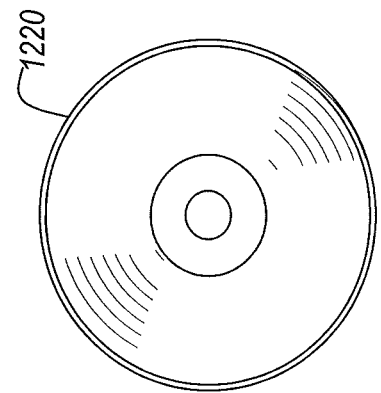
FIG. 6 illustrates a signal-bearing storage medium for storing machine-readable instructions of a program that implements the method according to the exemplary embodiment of the invention.
Figure 6:
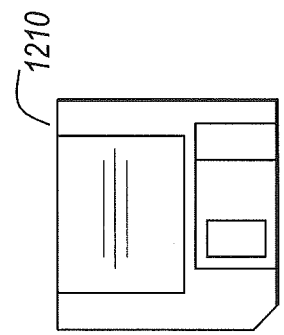

Alternatively, the instructions may be contained in another signal-bearing storage media 1200, such as a magnetic data storage diskette 1210 or optical storage diskette 1220 (FIG. 6), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
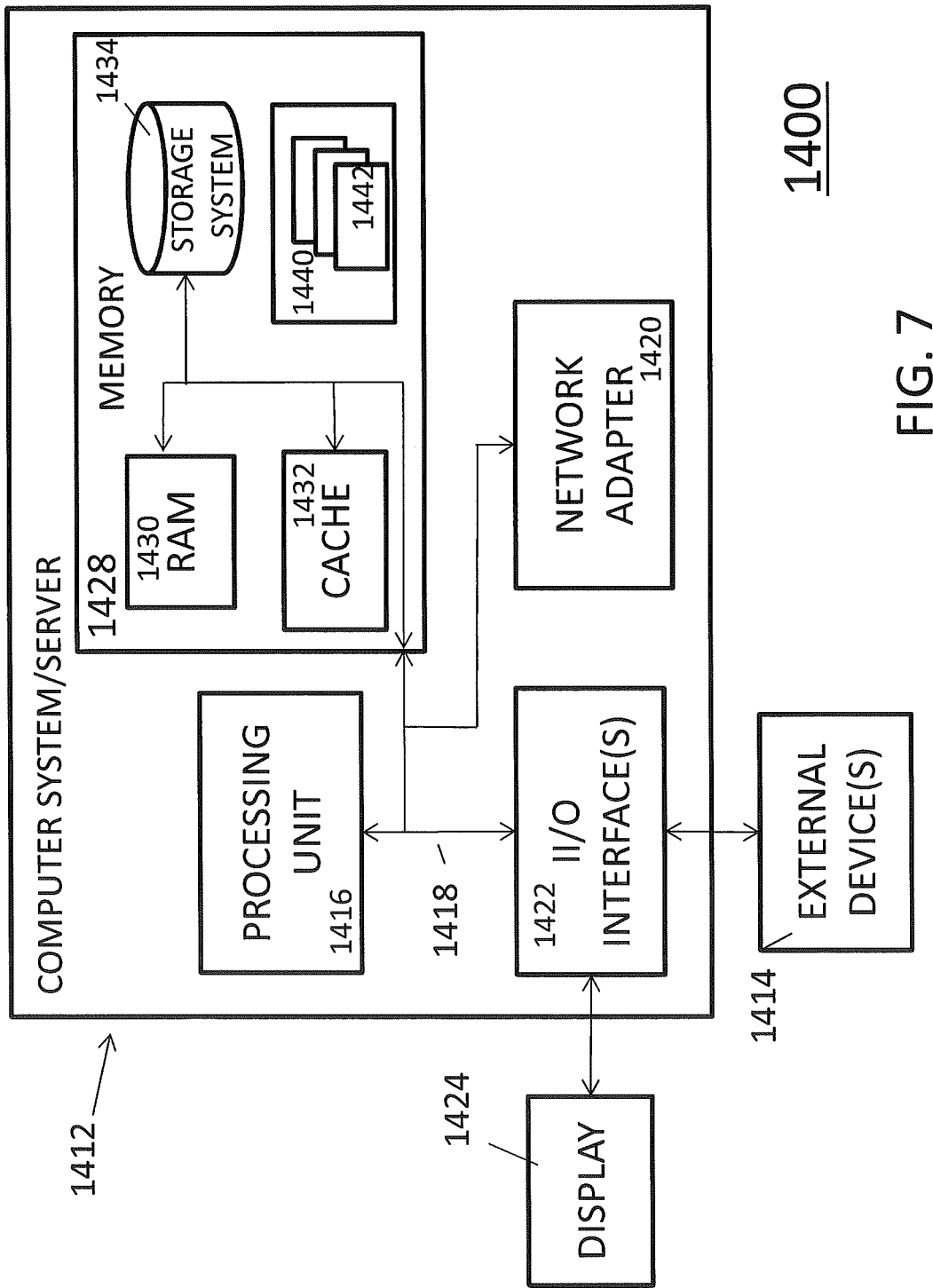
FIG. 7 depicts a cloud computing node according to an embodiment of the present invention.

Referring now to FIG. 7, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 8:
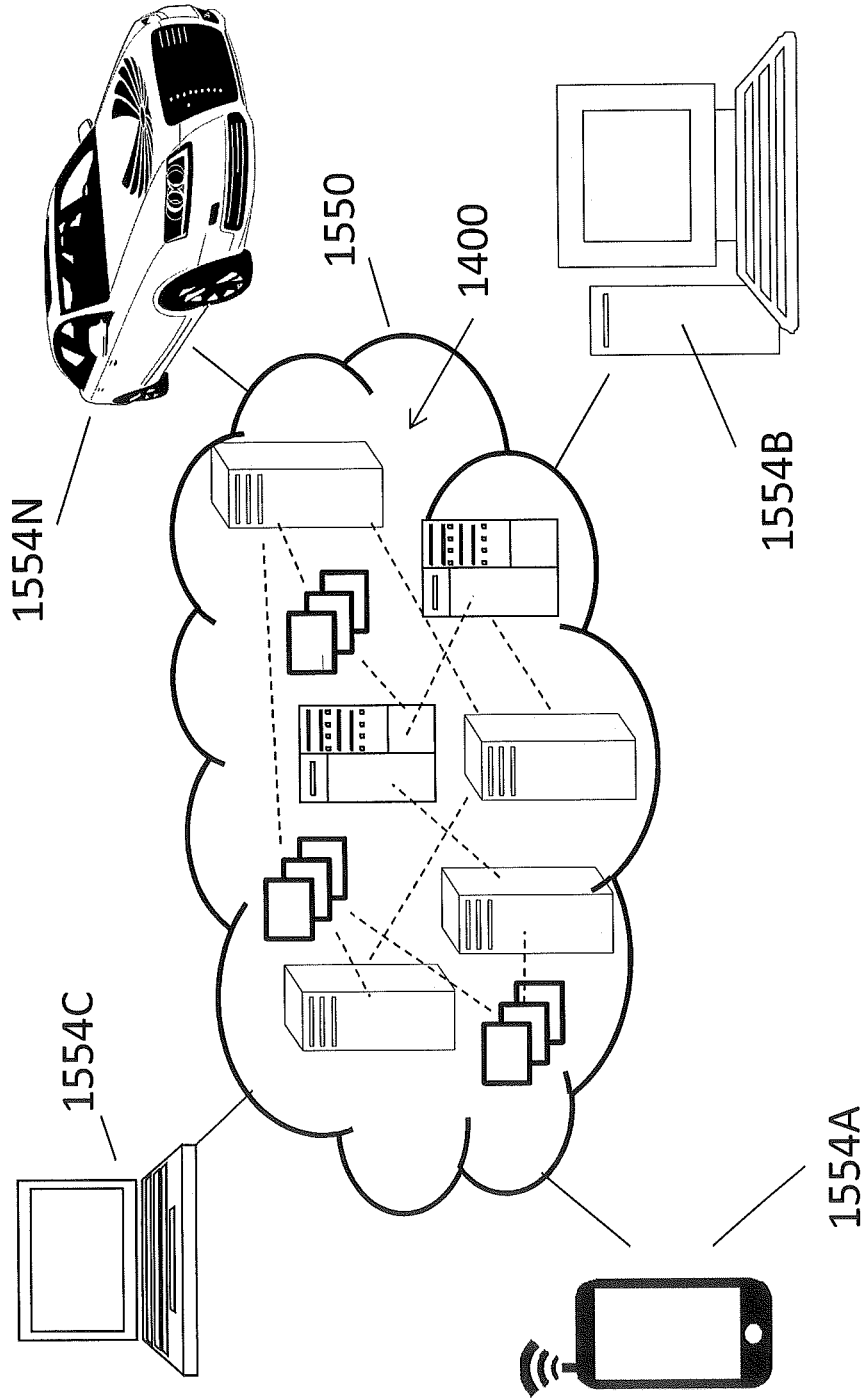
FIG. 8 depicts a cloud computing environment according to an embodiment of the present invention.

Referring now to FIG. 8, illustrative cloud computing environment 1550 is depicted. As shown, cloud computing environment 1550 comprises one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 8 are intended to be illustrative only and that computing nodes 1400 and cloud computing environment 1550 can communicate with any type of computerized device over any type of network and/or network addressable connection (e.g., using a web browser).

Figure 9:
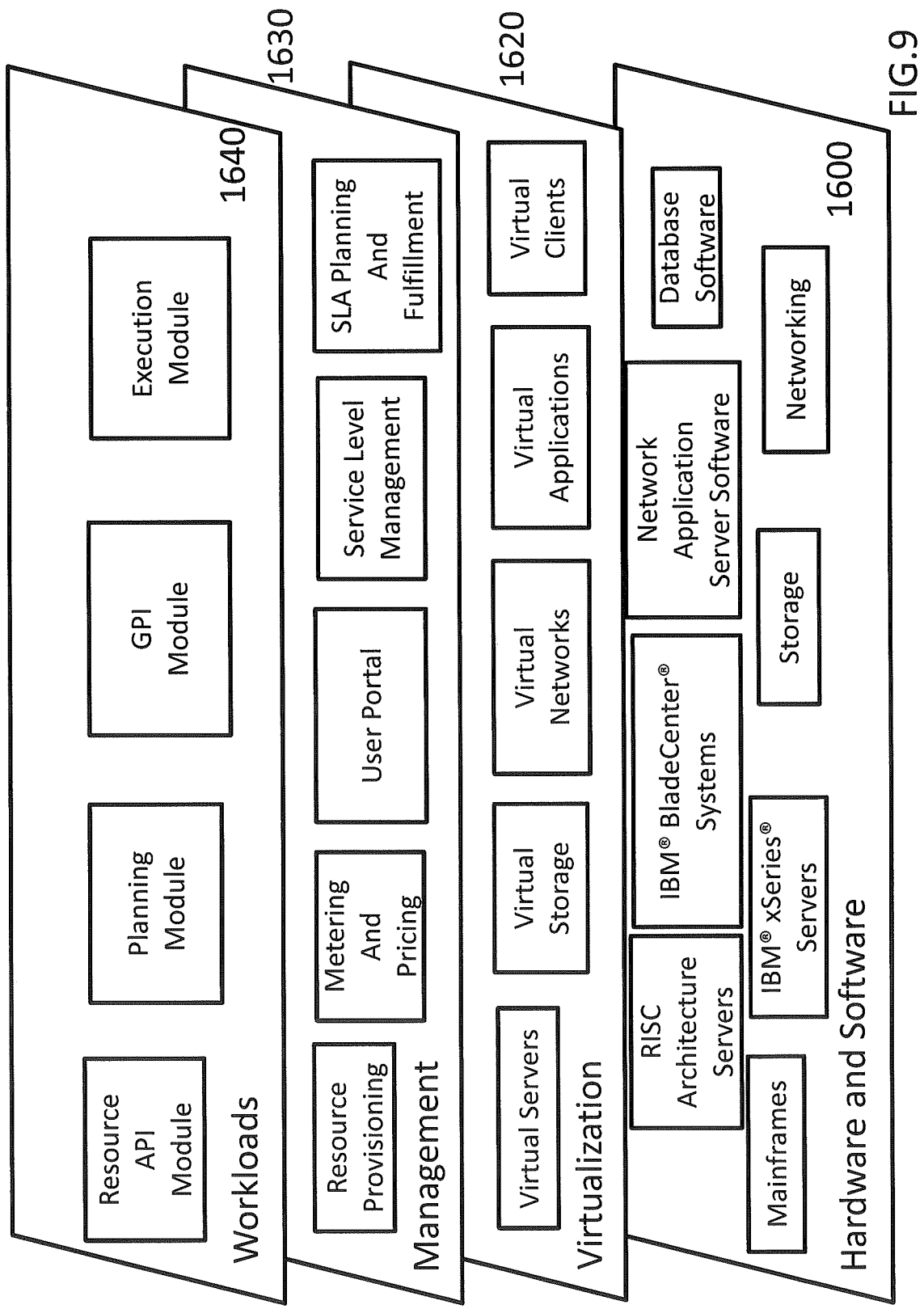
FIG. 9 depicts abstraction model layers according to an embodiment of the present invention.

Referring now to FIG. 9, a set of functional abstraction layers provided by cloud computing environment 1550 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the disclosed invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for evaluating aggregates in database systems including a computer, comprising:
    hashing of aggregation keys on a per bucket basis by the computer;
    performing aggregation as tuples are mapped by hashing on the per bucket basis;
    determining whether sorting hashed tuples is performed by the computer to aggregate data according to a number of the hashed tuples per bucket to access and organize data;
    depending on the number of hashed tuples per bucket, maintaining a secondary hash table for a bucket during a double hashing of the data; and
    delaying a decision to execution time as to whether to perform the sorting from the determining whether sorting hashed tuples is performed,
    wherein the aggregation is performed during the hashing of the aggregation keys on a per bucket,
    wherein items in a list from hashing are sorted based on a query,
    wherein each hash table entry corresponds to a key range, and points to the list of all items whose keys lie that range, and then based on the query, the items in the list are sorted, and
    wherein the performing of the aggregation as tuples is during the hashing of the aggregation keys.

2. The method according to claim 1,
    further comprising:
    based on the number of tuples hashed to the bucket, determining for each bucket as to whether to:
    maintain the bucket without change,
    maintain a list of items or pages including mapped tuples to the bucket, sort a final list to evaluate aggregates, and
    maintain a secondary hash table for the bucket, map tuples to the bucket, and aggregate as the secondary hash table is mapped.

3. The method according to claim 2 being implemented in a cloud computing server.

4. The method according to claim 1, further comprising of depending on the number of hashed tuples per bucket, maintaining a secondary hash table for a bucket during a double hashing, mapping tuples to the secondary hash table, and aggregating during mapping of the tuples to the secondary hash table, and
    wherein the hashing is performed as a first step before the sorting.

5. The method according to claim 1, wherein the hashing of the aggregation keys on a per bucket basis further comprises performing the aggregation of the keys as tuples are mapped by hashing on a per bucket basis in a hash table,
    further comprising switching in real-time whether to perform the sorting or to perform a secondary hashing.

6. The method according to claim 1, wherein in real-time there is a switching among a plurality of modes depending on the number of hashed tuples per bucket,
    wherein the plurality of modes includes a list mode, a no change mode, and a secondary hashing mode during a double hashing,
    wherein the list mode includes maintaining a list including mapped tuples to a particular bucket, and sorting a final list to evaluate aggregates,
    wherein the no change mode includes no change to the particular bucket,
    wherein the secondary hashing mode includes maintaining a secondary hash table for the particular bucket, mapping tuples to the secondary hash table, and aggregate as the secondary hash table is mapped, and
    wherein the hashing and sorting requires one code generation path.

7. The method according to claim 1, wherein the sorting of hashed tuples by the computer to aggregate data according to a number of the hashed tuples per bucket provides access and organization of the data received from a plurality of different sources.

8. A database machine, comprising:
    a memory;
    a processor coupled to the memory,
    the processor configured to perform a method comprising:
        hashing of aggregation keys on a per bucket basis;
        performing aggregation as tuples are mapped by hashing on the per bucket basis;
        sorting hashed tuples by the computer to aggregate data according to a number of the hashed tuples per bucket to access and organize data,
    wherein the aggregation is performed during the hashing of the aggregation
    keys on a per bucket, and
    wherein based on a query, items in a list from hashing are sorted; and
    depending on the number of hashed tuples per bucket, keeping a bucket without change.

9. The database machine according to claim 8,
    wherein each hash table entry corresponds to a key range, and points to the list of all items whose keys lie that range, and then based on the query, the items in the list are sorted.

10. The database machine according to claim 9, further comprising of depending on the number of hashed tuples per bucket, maintaining a secondary hash table for a particular bucket during at least a double hashing, and
    wherein the hashing and sorting requires one code generation path.

11. The database machine according to claim 10, further comprising of depending on the number of hashed tuples per bucket, maintaining a secondary hash table for a particular bucket, mapping tuples to the secondary hash table, and aggregating during mapping of the tuples to the secondary hash table during double hashing.

12. The database machine according to claim 11, wherein the hashing of the aggregation keys on a per bucket basis further comprises performing the aggregation of the keys as tuples are mapped by hashing on a per bucket basis in a hash table.

13. The database machine according to claim 12, wherein aggregation is preformed during the hashing.

14. The database machine according to claim 13, wherein in real-time there is a switching among a plurality of modes depending on the number of hashed tuples per bucket,
wherein the plurality of modes includes a list mode, a no change mode, and secondary hashing mode during double hashing,
wherein the list mode includes maintaining a list including mapped tuples to a particular bucket, and sorting a final list to evaluate aggregates,
wherein the no change mode includes no change to the particular bucket, and
wherein the secondary hashing mode includes maintaining a secondary hash table for the particular bucket, mapping tuples to the secondary hash table, and aggregate as the secondary hash table is mapped.

15. The database machine according to claim 14 being implemented in cloud computing.

16. The database machine according to claim 8,
wherein each hash table entry corresponds to a key range, and points to the list of items whose keys lie that range, and then based on the query, the items in the list are sorted.

17. The database machine according to claim 8, wherein each hash table entry corresponds to a key range, and
further comprising delaying a decision to execution time as to whether to perform the sorting from the determining whether sorting hashed tuples is performed.

18. A computer program product comprising a computer readable storage medium having program instructions embodied therewith, the program instructions readable and executable by a computer to cause the computer to perform a method, comprising:
a memory;
a processor coupled to the memory,
the processor configured to perform the method comprising:
hashing of aggregation keys on a per bucket basis; and
performing aggregation as tuples are mapped by hashing on the per bucket basis;
sorting hashed tuples by the computer to aggregate data according to a number of the hashed tuples per bucket to access and organize data,
wherein the aggregation is performed during the hashing of the aggregation
keys on a per bucket, and
wherein based on a query, items in a list from hashing are sorted; and
depending on the number of hashed tuples per bucket, keeping a bucket without change, and
wherein each hash table entry corresponds to a key range, and points to the list of all items whose keys lie that range, and then based on the query, the items in the list are sorted.

19. The computer program product according to claim 18, further comprising of depending on the number of hashed tuples per bucket, maintaining a secondary hash table for a particular bucket, map tuples to it, aggregate as you map to double hash the data,
wherein the hashing and sorting requires one code generation path.

20. The computer program product according to claim 19, further comprising of depending on the number of hashed tuples per bucket, maintaining a secondary hash table for a particular bucket to double hash, mapping tuples to the secondary hash table, and aggregating during mapping of the tuples to the secondary hash table.

* * * * *